United States Patent
Beckhoff (10) Patent No.: US 11,325,707 B2
(45) Date of Patent: May 10, 2022

(54) AUTOMATION SYSTEM AND METHOD FOR OPERATING AN AUTOMATION SYSTEM

(71) Applicant: BECKHOFF AUTOMATION GMBH, Verl (DE)

(72) Inventor: Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 311 days.

(21) Appl. No.: 16/587,885

(22) Filed: Sep. 30, 2019

(65) Prior Publication Data
US 2020/0070976 A1 Mar. 5, 2020

Related U.S. Application Data

(63) Continuation of application No. PCT/EP2018/057270, filed on Mar. 22, 2018.

(30) Foreign Application Priority Data

Mar. 31, 2017 (DE) ...................... 10 2017 106 996.8

(51) Int. Cl.
*B64C 39/02* (2006.01)
*G05B 19/418* (2006.01)
*G05D 1/00* (2006.01)

(52) U.S. Cl.
CPC ...... *B64C 39/024* (2013.01); *G05B 19/41895* (2013.01); *G05D 1/0088* (2013.01); *B64C 2201/027* (2013.01); *G05B 2219/49007* (2013.01)

(58) Field of Classification Search
CPC .............. B64C 39/02; B64C 2201/027; G05B 19/41895; G05B 2219/49007; G05D 1/0088; Y02P 90/02
See application file for complete search history.

(56) References Cited

U.S. PATENT DOCUMENTS

| | | | |
|---|---|---|---|
| 2010/0084513 A1* | 4/2010 | Gariepy | B64C 39/024 244/190 |
| 2014/0046589 A1 | 2/2014 | Metzler et al. | |
| 2016/0165190 A1* | 6/2016 | Beckhaus | H04N 7/18 348/82 |
| 2017/0334134 A1* | 11/2017 | Herzog | B29C 64/386 |
| 2018/0246503 A1* | 8/2018 | Bauer | B64C 39/024 |

(Continued)

FOREIGN PATENT DOCUMENTS

| | | |
|---|---|---|
| DE | 2015 115 184 A1 | 1/1900 |
| DE | 10 2014 201 203 A1 | 7/2015 |
| DE | 10 2015 104 052 A1 | 10/2015 |

(Continued)

OTHER PUBLICATIONS

ISA 100.11a—Wikipedia, https://en.wikipedia.org/wiki/ISA100. 11a, Accessed Sep. 30, 2019, 2 pages.

(Continued)

*Primary Examiner* — Michael J Zanelli
(74) *Attorney, Agent, or Firm* — Dorsey & Whitney LLP (57) ABSTRACT

An automation system, comprising a control device for controlling at least one machine, and at least one unmanned aircraft. The control device is designed to control the unmanned aircraft to support an operation of the machine.

23 Claims, 3 Drawing Sheets

(56) References Cited

U.S. PATENT DOCUMENTS

2018/0288372 A1\* 10/2018 Kirzinger .............. B64C 39/024

FOREIGN PATENT DOCUMENTS

| | | |
|---|---|---|
| DE | 20 2014 006 541 U1 | 11/2015 |
| DE | 10 2014 218 749 A1 | 3/2016 |
| DE | 10 2014 224 884 A1 | 6/2016 |
| DE | 10 2015 216 272 A1 | 3/2017 |
| DE | 10 2016 124 798 A1 | 6/2017 |
| EP | 2697604 A1 | 2/2014 |
| EP | 2697604 B1 | 3/2015 |
| EP | 3135441 A1 | 3/2017 |
| JP | 2015131713 A | 7/2015 |
| WO | 2016075025 A1 | 5/2016 |
| WO | 2016193667 A1 | 12/2016 |
| WO | WO2016198775 A1 \* | 12/2016 |
| WO | 2017042251 A1 | 3/2017 |

OTHER PUBLICATIONS

Notice of reasons for refusal dated Nov. 24, 2020 in connection with Japanese patent application No. 2019-553106, 6 pages including English translation.

\* cited by examiner

AUTOMATION SYSTEM AND METHOD FOR OPERATING AN AUTOMATION SYSTEM

CROSS-REFERENCE TO RELATED APPLICATIONS

This application claims priority to International Patent Application PCT/EP2018/057270, filed 22 Mar. 2018, entitled AUTOMATION SYSTEM AND METHOD FOR OPERATING AN AUTOMATION SYSTEM, and German Patent Application DE 10 2017 106 996.8, filed 31 Mar. 2017, entitled AUTOMATISIERUNGSSYSTEM UND VERFAHREN ZUM BETREIBEN EINES AUTOMATISIERUNGSSYSTEMS, each which is incorporated by reference herein, in the entirety and for all purposes.

FIELD

The invention relates to an automation system. The invention further relates to a method for operating an automation system. The invention further relates to a computer program.

BACKGROUND

Laid-open specification DE 10 2014 201 203 A1 describes an interaction of an agricultural working vehicle with an associated drone, wherein an adaptation of the actuator settings of the working vehicle is performed by sensor data of the drone. The possibility of an automatic accumulator exchange or exchange of another device for transmitting electrical energy from the working vehicle to the drone is described.

Laid-open specification DE 10 2014 218 749 A1 describes a method for supporting an operation of a working machine, for example an excavator. A generation of image data of an end effector and/or of an object manipulated by the end effector is provided by a camera of an unmanned flying object. The image data are transmitted to a display device which is arranged on the working machine.

Laid-open specification DE 10 2014 224 884 A1 shows a method and a system for monitoring processes and/or operating states in logistics facilities. The known system comprises an unmanned flying device having at least one sensor, at least one data processing unit and at least one output device. The known method comprises a detection of an actual state of at least one characteristic variable in the logistics facility by the at least one sensor of the at least one flying device. The data representing the actual state are transmitted to the data processing unit. The latter processes the data.

Laid-open specification DE 10 2015 104 052 A1 describes a method for delivering mail by an unmanned transport device.

Utility model specification DE 20 2014 006 541 U1 describes an unmanned flying device for carrying out a resistance, current and/or voltage measurement on an object, in particular a lightning protection measurement on a wind turbine.

Patent specification EP 2 697 604 B1 describes a measuring system for determining 3D coordinates using an unmanned flying device.

SUMMARY

The present invention provides an improved concept for an efficient operation of an automation system.

EXAMPLES

According to one aspect, an automation system is provided, comprising a control device for controlling at least one machine, at least one unmanned aircraft, wherein the control device is designed to control the unmanned aircraft to support an operation of the (at least one) machine.

According to another aspect, a method for operating the automation system is provided, comprising controlling the unmanned aircraft by the control device to support an operation of the (at least one) machine.

According to a further aspect, a computer program is provided which comprises program code for carrying out the method for operating the automation system when the computer program is executed on a computer, in particular on the control device of the automation system.

According to a further aspect, an automation system comprises at least one machine, at least one unmanned aircraft, a control device which is designed to control the unmanned aircraft to support an operation of the machine, wherein the control device is an automation controller for controlling the at least one machine, wherein the machine comprises one or more movement axes which are controlled by the control device, wherein the unmanned aircraft is co-integrated, as a further movement axis, by the control device into the control of the machine.

According to a further aspect method for operating an automation system is provided, comprising:
    controlling the unmanned aircraft by the control device to support an operation of the machine,
    wherein the control device is an automation controller for controlling the machine,
    wherein the machine comprises one or more movement axes which are controlled by the control device,
    wherein the unmanned aircraft is co-integrated, as a further movement axis, by the control device into the control of the machine.

In order to control the unmanned aircraft, precisely the control device, which also controls the (at least one) machine of the automation system, is used. An efficient utilization of the control device is thus achieved. This is because, on the one hand, it controls the (at least one) machine of the automation system. On the other hand, it also additionally controls the unmanned aircraft.

The control device is thus particularly designed to control both the at least one machine and the unmanned aircraft. The control device can thus particularly control both the at least one machine and the unmanned aircraft. The control device thus particularly controls both the at least one machine and the unmanned aircraft.

That is thus to say in particular that the control device of the automation system has a double function: controlling the machine of the automation system and controlling the unmanned aircraft.

Thus by virtue of the fact that the control device also performs the control of the unmanned aircraft in parallel to the control of the machine, an autonomous system is present in an advantageous manner.

By virtue of the fact that the control device controls the unmanned aircraft in such a way that it supports an operation of the (at least one) machine, particularly the technical advantage is achieved that the machine can be efficiently supported in its operation.

Consequently, particularly the technical advantage is thus achieved that the automation system can be efficiently operated. In this respect, the technical advantage is achieved that an efficient concept for the efficient operation of an automation system is provided.

In one embodiment, the control device comprises one or more processors which can execute the computer program or which execute the computer program.

In one embodiment, the control device comprises one or more memories in which the computer program or at least parts thereof can be stored or are stored.

In one embodiment, the automation system comprises the at least one machine.

According to one embodiment, the unmanned aircraft comprises a dedicated flight controller for controlling a flight mode, in particular for controlling a flight movement. The aircraft can thus for example fly autonomously in an advantageous manner.

In one embodiment, there is provision that flight commands for the aircraft are transmitted to the flight controller by the control device, for example are transmitted wirelessly, that is to say for example by radio.

According to one embodiment, the aircraft thus obtains its flight commands from the machine or installation controller, that is to say from the control device, and thus becomes a functional constituent part of the machine or installation, in general of the automation system. The control device can be referred to in particular as a machine controller and/or as an installation controller. The concept thus particularly makes provision that the machine controller of the machine or the installation controller of the installation, in addition to controlling the machine and/or the installation, can also be used to control the unmanned aircraft.

According to one embodiment, the at least one machine is a machine arranged in a stationary manner.

According to one embodiment, the control device is arranged in a stationary manner.

In one embodiment, the at least one machine is different from a, for example self-propelled, vehicle. The vehicle is for example a land vehicle, for example an agricultural working vehicle, for example a forage harvester.

Within the sense of the description, an agricultural working vehicle, for example a forage harvester, is different from an automation system. An automation system is thus not an agricultural working vehicle or does not comprise an agricultural working vehicle, and is thus free from an agricultural working vehicle.

In one embodiment, the control device is arranged in a spatially separate manner from the at least one machine. The at least one machine and the control device are thus for example arranged at a distance from one another. According to one embodiment, the at least one machine does not comprise the control device. That is thus to say in particular that, according to one embodiment, the at least one machine is free from the control device.

An unmanned aircraft within the sense of the description can also be referred to as a drone.

According to one embodiment, the unmanned aircraft is one of the following aircraft: airplane, rotorcopter, in particular a helicopter, quadrocopter, octocopter or airship.

According to one embodiment, there is provision that the control device is a programmable logic controller (PLC).

For example, the technical advantage is thus achieved that an efficient and flexible programming of the controller is made possible.

The expression "at least one machine" particularly encompasses the expression "one or more machines." That is thus to say in particular that for example a plurality of machines are provided.

In the case of a plurality of machines, they are for example of identical design or for example of different design.

The machines or the plurality of machines are for example part of an installation or a plurality of installations.

Statements which are made in connection with a machine analogously apply to a plurality of machines, and vice versa.

The expression "the machine" is always intended to be read as including the expression "the at least one machine."

The expression "at least one unmanned aircraft" particularly encompasses the expression "one or more unmanned aircraft." That is thus to say in particular that for example a plurality of aircraft are provided.

In the case of a plurality of unmanned aircraft, they are for example of identical design or for example of different design.

Statements which are made in connection with an aircraft analogously apply to a plurality of aircraft, and vice versa.

The expression "the (unmanned) aircraft" is always intended to be read as including the expression "the at least one (unmanned) aircraft."

If the machine is part of an installation, the control device is thus particularly designed to control the installation. In this respect, the control device in this case is particularly designed to control the unmanned aircraft to support an operation of the installation.

According to one embodiment, the machine is one of the following machines: transport system, in particular linear transport system, production line, for example a production line for motor vehicles, or a conveyor belt.

According to one embodiment, the installation is one of the following installations: compressed-air installation or process installation. A process installation is for example a recycling installation, an oil refinery, a treatment installation, a sewage installation, a biogas installation or a grinding plant.

In one embodiment, there is provision that the control device is designed to control the unmanned aircraft in dependence on the control of the machine.

For example, the technical advantage is thus achieved that the unmanned aircraft can be controlled in an efficient manner. According to this embodiment, there is thus provision that, in order to control the unmanned aircraft, the control of the machine by the control device is taken into consideration.

As a result, there is thus achieved for example the technical advantage that an efficient interaction between machine and aircraft can be achieved.

The processes which are carried out by the machine can thus be efficiently tailored to the operation of the unmanned aircraft, and vice versa.

In one embodiment, the control comprises a synchronization of a flight speed of the unmanned aircraft with a conveying speed of a conveyor belt.

According to one embodiment, there is provision that the control device is designed to determine control data for controlling the unmanned aircraft for the unmanned aircraft, wherein the control data specify a task to be carried out by the unmanned aircraft to support the operation of the machine, wherein the unmanned aircraft is designed to carry out the task to be carried out autonomously and/or in a remote-controlled manner by the control device on the basis of the control data.

For example, the technical advantage is thus achieved that the task to be carried out can be performed efficiently.

Particularly if the aircraft autonomously carries out the task to be carried out on the basis of the control data, particularly the technical advantage is achieved that the control device then has more computing capacity to carry out other tasks.

If for example the control device remote controls the unmanned aircraft on the basis of the control data such that it carries out the task to be carried out, for example the technical advantage is achieved that furthermore an efficient control by the unmanned aircraft can be achieved via the remote control.

It is generally also the case that a remote-controllable aircraft has to be of less complex design than an aircraft which can be operated autonomously. The provision of a remote control possibility thus particularly achieves the technical advantage that a technical complexity can be reduced.

According to one embodiment, there is provision that the task comprises one or more of the following tasks: transporting an object to the machine, transporting an object from the machine to a predetermined location, fetching an object from a predetermined location and transporting the object to the machine, checking at least one property of a product produced by the machine, repairing and/or post-processing a faulty product produced by the machine, filling a packaging unit which is not completely filled by the machine, introducing and/or exchanging a sequence of objects to be processed by the machine, detecting the machine and/or an environment of the machine by an environment sensor of the unmanned aircraft and transmitting environment sensor data corresponding to the detection to the control device.

According to one embodiment, the machine comprises one or more movement axes which are controlled or monitored by the control device, for example with the execution of a control software.

According to one embodiment, there is provision that the aircraft acts as a further movement axis or is used as a further movement axis. That is to say in particular that the aircraft is co-integrated, as a further movement axis, into the control of the machine by the control device.

The following example is intended to serve for better understanding of what is to be understood by a movement axis.

According to one embodiment, the machine is a linear drive system which drives or can drive a plurality of carriages which are guided on a rail. For the control device, each carriage is a dedicated movement axis.

In particular, the technical advantage is thus achieved that the above-described tasks can be carried out efficiently. This is because as a rule an unmanned aircraft can carry out these tasks quicker than a human person. Thus, for example, the unmanned aircraft can also fly to locations which are accessible only with difficulty to a human.

Furthermore, the use of the unmanned aircraft to carry out these tasks particularly advantageously allows the unmanned aircraft to be able to carry out tasks also at locations where harm to human health could occur.

If for example the unmanned aircraft repairs and/or post-processes a faulty product produced by means of the machine, particularly the technical advantage is achieved that the product can continue to remain within the production line and does not have to be removed therefrom. This is because the unmanned aircraft can repair or post-process the faulty product still on the production line.

An object within the sense of the description is for example a tool or replacement part for the machine. An object within the sense of the description is for example a semifinished product which is intended to be processed by the machine.

If it is thus for example determined that semifinished products are lacking on the machine, the unmanned aircraft can efficiently transport the absent semifinished produced to the machine. The machine can thus in particular be further operated in an advantageous manner. Consequently, particularly the technical advantage is achieved that a standstill of the machine on account of absent parts, for example semifinished products, can be efficiently avoided.

According to one embodiment, there is provision that the unmanned aircraft and/or the control device are/is designed to determine an instantaneous position of the unmanned aircraft, wherein the control device is designed to control the unmanned aircraft on the basis of the instantaneous position of the unmanned aircraft.

As a result, particularly the technical advantage is achieved that the unmanned aircraft can be efficiently controlled.

The knowledge of the instantaneous position of the unmanned aircraft is especially of particular relevance if for example a plurality of unmanned aircraft are provided. It is thus advantageously possible to avoid a situation in which the plurality of unmanned aircraft hinder one another or in which the plurality of aircraft collide with one another.

According to one embodiment, a stationary radar device is provided which is designed to determine an instantaneous position of the unmanned aircraft. The control device is for example communicatively connected to the radar device.

Alternatively or additionally to the stationary radar device, according to one embodiment a stationary camera system and/or another 3-dimensional contactless measuring system are/is provided for determining the instantaneous position of the unmanned aircraft.

According to one embodiment, there is provision that the unmanned aircraft is designed to detect an environment of the aircraft during a flight, wherein the unmanned aircraft and/or the control device are/is designed to create a digital map of the environment on the basis of the detected environment and to determine the instantaneous position of the unmanned aircraft within the digital map.

This embodiment is based on the finding that the position determination, that is to say in particular a localization, of the unmanned aircraft is based inter alia on an environment detection. The detected environment is particularly compared within the scope of the localization with a digital map in order to locate the aircraft, that is to say in particular to determine the position of the aircraft.

As a result, particularly the technical advantage is achieved that the localization, in particular the position determination, of the aircraft is made possible in an efficient manner. In particular, the position determination is even made possible when for example, no GPS reception is present.

By virtue of the fact that the digital map is created on the basis of the detected environment, particularly the technical advantage is achieved that the digital map can be created efficiently without additional external measurement means or landmarks in the environment of the machines.

In particular, for example the technical advantage is achieved that no external measurements have to be carried out for the purpose of creating the digital map. Here, "external" is to be seen particularly relative to the aircraft.

According to one embodiment, there is provision that the unmanned aircraft and/or the control device are/is designed to create the digital map of the environment using a SLAM method.

As a result, in particular the technical advantage is achieved that the digital map can be created efficiently.

The abbreviation "SLAM" stands for "simultaneous localization and mapping."

SLAM methods are already known as such in robotics. On the basis of such methods, a mobile robot, for example, simultaneously creates a map of its surroundings and estimates its position within this map.

SLAM methods comprise for example one or more of the following methods: EKF-SLAM (extended Kalman filter), for example SEIF (space extended information filter), UKF (unscented Kalman filter), SLAM with particle filter, for example Fast SLAM, grid-based methods with Rao-Blackwellized particle filters, DP-SLAM, "expectation maximization filter", graph-based techniques, for example Graph-SLAM, TORO, HOG-Man Tree Map, relaxation techniques, smoothing techniques.

SLAM methods are thus particularly based on the digital map being created or built up incrementally.

That is thus to say that, according to one embodiment, the digital map is built up incrementally.

That is thus to say in particular that for example at first no digital map is present. The digital map is thus for example newly created.

For example, there is provision that an instantaneous position of the aircraft defines the origin of a coordinate system in the digital map. Consequently, there is thus provision for example that a first environment detection is carried out from the instantaneous position such that for example the detected environment is integrated with the instantaneous position into the digital map.

After this first environment detection, there is provision for example that a second environment detection is carried out from a new position of the aircraft that results on account of the further flying.

The first and the second environment detection will partially overlap such that a part of the surroundings known from the first environment detection is recognized from the new position. Here, a new, previously unknown region of the environment is also detected from the new position.

For example, a movement of the aircraft is calculated from the overlap such that an absolute position (new position) relative to the origin of the coordinate system is known, with the result that the second detected environment can be or is integrated with the new position into the digital map. Thus, on the basis of this procedure, the digital map is expanded or built up incrementally until for example a certain area within which the machine or installation is arranged is measured.

According to one embodiment, there is provision that the control device is designed to control an energy management of the unmanned aircraft.

As a result, for example the technical advantage is achieved that an energy consumption of the unmanned aircraft can be efficiently controlled. This is because the control device generally has a precise overview of the overall operation of the automation system, with the result that additional information corresponding to the precise overview can be utilized to control the energy management of the unmanned aircraft.

According to one embodiment, there is provision that the unmanned aircraft has a first energy supply exclusively for a flight operation and a second energy supply for an actuator and/or a sensor, wherein the control device is designed, when a storage capacity of the first energy supply falls below a predetermined storage capacity threshold value, to switch from the first energy supply to the second energy supply to maintain the flight operation.

As a result, for example the technical advantage is achieved that a flight operation can be maintained efficiently.

That is thus to say in particular that the unmanned aircraft has a first energy supply which is used exclusively for the flight operation. The second energy supply is used for an energy supply for an actuator or a sensor. The second energy supply is thus used for the flight operation only when a storage capacity of the first energy supply falls below a predetermined threshold value.

According to one embodiment, the first or second energy supply comprises one or more accumulators or one or more batteries.

According to one embodiment, there is provision that the control device is designed to monitor an actual state, for example energy consumption or residual flying time, of the unmanned aircraft and to control the unmanned aircraft on the basis of the actual state.

According to this embodiment, there is thus provision that the control device carries out a so-called "condition monitoring." The concept of "condition monitoring" is thus based in particular on a regular or permanent detection of a machine state or operating state of the unmanned aircraft by for example measuring and analyzing one or more physical variables. For example, the control device monitors an operating temperature of the unmanned aircraft. An operating temperature comprises or is for example a temperature of the drive motor or of the first or second energy supply.

An actual state thus particularly comprises the above-described temperature or the above-described temperatures. An actual state comprises for example an energy consumption of the unmanned aircraft. An actual state comprises for example a residual flying time of the unmanned aircraft.

The provision of a condition monitoring thus particularly achieves the technical advantage that the aircraft can be controlled efficiently.

Therefore, it is thus possible, particularly during task planning for the unmanned aircraft by the control device, to take into consideration a residual flying time or an energy consumption of the aircraft. It is thus possible for example to avoid a situation in which the unmanned aircraft can no longer carry out at all a task assigned to it as a result of too high an energy consumption or too little residual flying time. Therefore, it is thus particularly possible to avoid unnecessary delays which could arise for example if the aircraft, as stated above, cannot carry out its task for the reasons described above.

An actual state of the aircraft particularly comprises a status of the aircraft. Here, a status particularly designates whether the aircraft is damaged or undamaged.

That is thus to say in particular that the control device monitors whether the aircraft is damaged or undamaged.

According to one embodiment, there is provision that a plurality of unmanned aircraft are provided, wherein the control device is designed to control the plurality of unmanned aircraft in such a way that one of the plurality of unmanned aircraft is supplied at a charging station with electrical energy for a flight operation and/or for a sensor and/or an actuator, while the remainder of the plurality of unmanned aircraft are operated in a flight operation.

As a result, particularly the technical advantage is achieved that an efficient operation of the plurality of aircraft can be achieved. In particular, the technical advantage is thus achieved that, in the event of a failure of one of the remaining aircraft, this failed aircraft can be replaced by the aircraft which is instantaneously being supplied at the charging station with electrical energy. Therefore, particularly the technical advantage of a redundancy is thus achieved.

According to one embodiment, the automation system comprises one or more charging stations which are designed to supply one or more aircraft with electrical energy.

According to one embodiment, there is provision that the control device is designed to control the one or the more charging stations in order to supply the docked aircraft with electrical energy.

According to one embodiment, there is provision that the machine is a cutting machine, in particular a laser cutting machine, or a 3D printer, wherein the unmanned aircraft is designed as a machining head of the cutting machine or as a working head of the 3D printer.

This embodiment is thus based on the idea that the unmanned aircraft is a functional part of the cutting machine or of the 3D printer.

That is thus to say in particular that the aircraft is designed as a machining head of the cutting machine, in particular of the laser cutting machine. That is thus to say in particular that the unmanned aircraft is designed as a working head of the 3D printer.

As a result, there is thus advantageously made possible a flexible and efficient utilization of the cutting machine or of the 3D printer. The workpiece to be processed for example no longer has to be transported to the cutting machine or to the 3D printer, but the workpiece can be processed in situ by the aircraft flying to the workpiece.

The unmanned aircraft is thus for example a machining head of the cutting machine.

The unmanned aircraft is thus for example a working head of the 3D printer.

According to one embodiment, there is provision that the unmanned aircraft comprises one or more sensors.

Statements which are made in connection with a sensor particularly analogously apply to a plurality of sensors, and vice versa.

In the case of a plurality of sensors, they are designed for example to be identical or for example to be different.

The sensor is designed for example to detect an environment of the unmanned aircraft and to determine environment sensor data corresponding to this detection.

The sensor is designed for example to detect an environment of the machine or to detect the machine and to determine environment sensor data corresponding to the detection.

A sensor within the sense of the description is for example one of the following sensors: radar sensor, ultrasound sensor, lidar sensor, laser sensor, magnetic sensor, temperature sensor, pressure sensor, microphone, Hall sensor, gas sensor, particle sensor, distance sensor, infrared sensor, video sensor, in particular video sensor of a video camera, for example of a 3D video camera.

That is thus to say in particular that the unmanned aircraft has one or more sensors which for example detect an environment of the unmanned aircraft. In particular, these sensors detect the machine or an environment of the machine.

According to one embodiment, the unmanned aircraft comprises one or more video cameras, for example 3D video cameras, for an environment detection.

According to one embodiment, the unmanned aircraft comprises a communication interface which is designed to communicate with the control device, for example to communicate with the control device via a communication network.

The communication interface is designed for example as a wireless and/or as a wired communication interface.

That is thus to say in particular that a communication between the unmanned aircraft and the control device can be carried out in a wireless or wired manner.

A communication network within the sense of the description comprises for example one or more of the following communication networks: WLAN, mobile radio, WISA ("Wireless System for Industrial Automation: Process Control and Related Applications"; ISA100.11a), DECT, ZigBee, ultra broadband (UWB), WirelessHART, Bluetooth, in particular Bluetooth-LE.

A communication network within the sense of the description comprises for example a bus system, for example an EtherCAT bus system.

For example, the communication between the control device and the unmanned aircraft is carried out via an optical communication connection, for example using a laser. This is especially advantageous for a data transmission speed and a particularly high electromagnetic compatibility (EMC).

In one embodiment, the aircraft is connected to the control device by a cable. The cable comprises for example a power cable or is a power cable. The cable comprises for example a communication cable or is a communication cable. It is thus possible in an advantageous manner for the aircraft to be efficiently supplied with power by the cable, or efficient cable-bound communication can be established with the aircraft.

According to one embodiment, the unmanned aircraft comprises one or more actuators.

Statements which are made in connection with an actuator analogously apply to a plurality of actuators, and vice versa.

In the case of a plurality of actuators, they are designed for example to be identical or for example to be different.

An actuator is for example a hydraulic or pneumatic actuator. An actuator is for example a bimetallic actuator. An actuator is for example an electric motor. An actuator is for example a piezo actuator or a magnetostrictive actuator.

An actuator comprises for example a gripping arm or is a gripping arm.

According to one embodiment, there is provision that the unmanned aircraft comprises a shielding device in order for example to minimize in an advantageous manner wind loads for, for example, the workpiece to be transported or to be processed.

A shielding device comprises for example one or more covers.

Technical functionalities of the method for operating the automation system result directly and analogously from corresponding technical functionalities of the automation system, and vice versa.

That is thus to say in particular that method features result directly from features of the automation system, and vice versa.

According to one embodiment, there is provision that the automation system is designed or configured to carry out the method for operating the automation system.

Control data within the sense of the description comprise for example one or more of the following data: setpoint trajectory data of a setpoint trajectory to be flown by the aircraft, position data of a position to be flown to by the aircraft or of a location to be flown to by the aircraft.

According to one embodiment, the machine is part of a production line for motor vehicles. The production line for motor vehicles comprises a plurality of workstations at which a motor vehicle to be produced is successively assembled or produced. One of these workstations is for example a painting installation in which the motor vehicle is painted. There is provision according to one embodiment that, downstream of this workstation, that is to say downstream of the painting installation, the unmanned aircraft monitors, by a sensor, for example a video sensor, as the task to be carried out whether the motor vehicle has been completely painted.

If the motor vehicle has not been completely painted, there is provision according to one embodiment that the unmanned aircraft, as the task to be carried out, automatically repaints the motor vehicle at the corresponding points. For this purpose, there is provision for example that the aircraft has a painting device.

According to one embodiment, the automation system comprises a filling installation for filling beverage bottles. According to this embodiment, there is provision for example that, after filled beverage bottles have been loaded into a beverage crate, the unmanned aircraft monitors, by a sensor, for example by a video sensor, as the task to be carried out whether the beverage crate has been completely filled.

If the beverage crate has not been completely filled, there is provision according to one embodiment that the aircraft completely loads the not completely filled beverage crate as the task to be carried out. For this purpose, there is provision for example that the unmanned aircraft flies to a storage location and picks up one or more beverage bottles there and then transports them to the not completely filled beverage crate.

Here, there can be provision for example that the not fully filled beverage crate is transported further by a conveyor belt while the aircraft completely loads the beverage crate. Therefore, the filling installation can thus advantageously be operated further. It is particularly possible thereby in an advantageous manner to avoid downtimes.

The expression "or" particularly encompasses the expression "and/or."

BRIEF DESCRIPTION OF THE DRAWINGS

The present invention will be explained in more detail in conjunction with the accompanying drawings.

DETAILED DESCRIPTION

In the following, same reference numerals may be used for same features.

Figure 1:
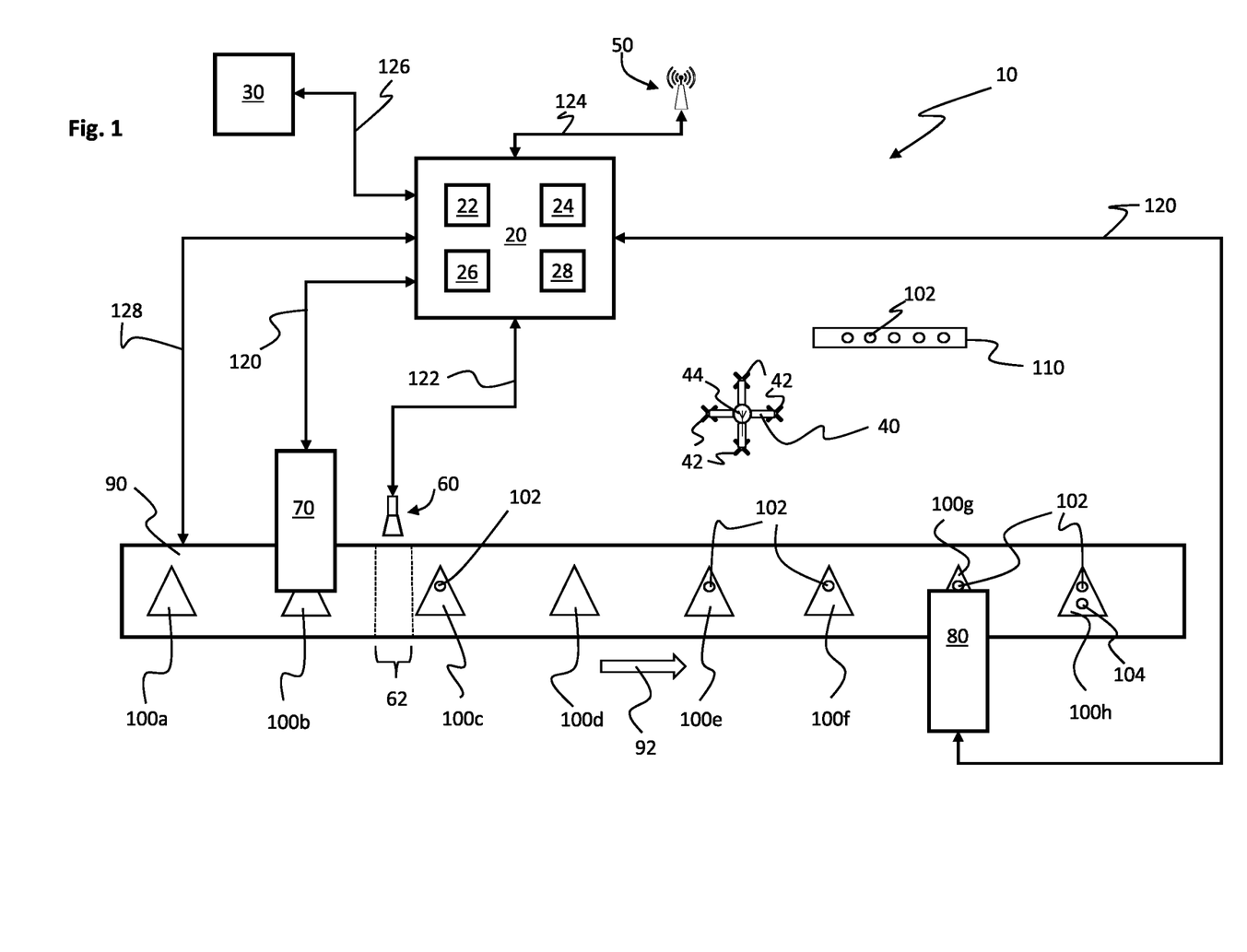
FIG. 1 shows an automation system with one unmanned aircraft.

FIG. 1 shows an automation system 10.

The automation system 10 comprises a control device 20. Within the control device 20 are arranged, for example, a plurality of cores ("computing cores") 22, 24, 26, 28 which perform different control tasks, for example communication with a superordinate unit 30, control of processing stations 70, 80, control of a camera 60, control of a conveyor belt 90 and control of a drone 40.

The control device 20 is connected via a bidirectional data line 126 to a superordinate unit 30 which can be, for example, a factory controller and/or a control station and/or an operator-control terminal, by which the automation system 10 can be monitored and/or commands for the control device 20 generated in an automated manner and/or on the part of an operator.

The automation system 10 further comprises a conveyor belt 90 on which products 100a to 100h are transported in a conveying direction 92. Placement or removal of the products 100a to 100h at the beginning or at the end of the conveyor belt 90 is illustrated here for the sake of clarity.

During the transport of the products 100a to 100h, they pass through two processing stations 70 and 80. In the first processing station 70, elements 102 are, for example, adhesively bonded onto the products 100a to 100h. In the second processing station 80, second elements 104 are then, for example, adhesively bonded onto the products 100a to 100h.

In order to correspondingly control the adhesive bonding process in the two processing stations 70 and 80 and the product transport by the conveyor belt 90, the control device 20 is connected via bidirectional data lines 120 and 128 to the processing stations 70 and 80 and to the conveyor belt 90.

A camera 60 is arranged downstream of the first processing station 70 for quality control, said camera detecting images of the products 100a to 100h in a monitoring region 62 of the conveyor belt 90 and, likewise by a bidirectional data line 122, transmitting corresponding sensor data to the control device 20.

The conveyor belt 90 and the processing stations 70, 80 here particularly form an installation. The conveyor belt 90 is an example of a machine. The processing stations 70, 80 each form an example of a further machine. The automation system 10 thus comprises a plurality of machines: the conveyor belt 90 and the processing stations 70, 80, the conveyor belt 90 and the processing stations 70, 80 being controlled by the control device 20.

As illustrated in FIG. 1, the product 100a is still situated upstream of the first processing station 70, whereas the adhesive bonding process of the first element 102 is currently being performed for the product 100b. It has been detected by the camera 60 and transmitted to the control device 20 by the data line 122 that, in the case of the products 100c, 100e, 100f, 100g and 100h, the adhesive bonding process has been successfully carried out in the first processing station 70, with the result that these products are provided with an element 102. The camera 60 has also detected and transmitted to the control device 20 that the adhesive bonding process was not successful in the case of the product 100d and that this product does not have an adhesively bonded element 102.

In order nevertheless to be able to leave the product 100d in the further production process and also continue to use it, the control device 20 now controls a drone 40 (unmanned aircraft) assigned to the automation system 10. For this purpose, the control device 20 calculates, for example in real time, a flight path of the drone 40 and also work steps of the actuators which are arranged on the drone 40.

The flight path and the work steps form control data.

The control data for the drone 40 are transmitted from the control device 20 by a further bidirectional data line 124 to a transmitter 50 which then transmits said data to the drone 40 by a wireless communication technology, for example WLAN.

To receive the control data, the drone 40 comprises an antenna 44. The drone 40 further comprises four individual rotor arrangements 42, with the result that the drone 40 is designed as a quadrocopter.

The control data thus comprise instructions, that is to say a task to be carried out by the drone 40, that the drone 40 fetches from a storage facility 110 in each instance an element 102 stored there, flies it to the product 100d and adhesively bonds the missing element 102 there. Here, the drone 40 flies in synchronous speed with the conveying speed of the conveyor belt 90, with the result that the continuous conveying process does advantageously not have to be interrupted.

For the purpose of picking up, holding, adhesively bonding and releasing the element 102, the drone 40 comprises correspondingly designed actuators and energy supplies.

According to one embodiment, data of the drone 40 are transmitted back to the control device 20 via the wireless communication connection between the transmitter 50 and the antenna 44. Such data comprise for example position data and/or sensor data, for example environment sensor data, of one or more sensors, and/or state data on an energy consumption and/or a residual flying time of the drone 40.

Figure 2:
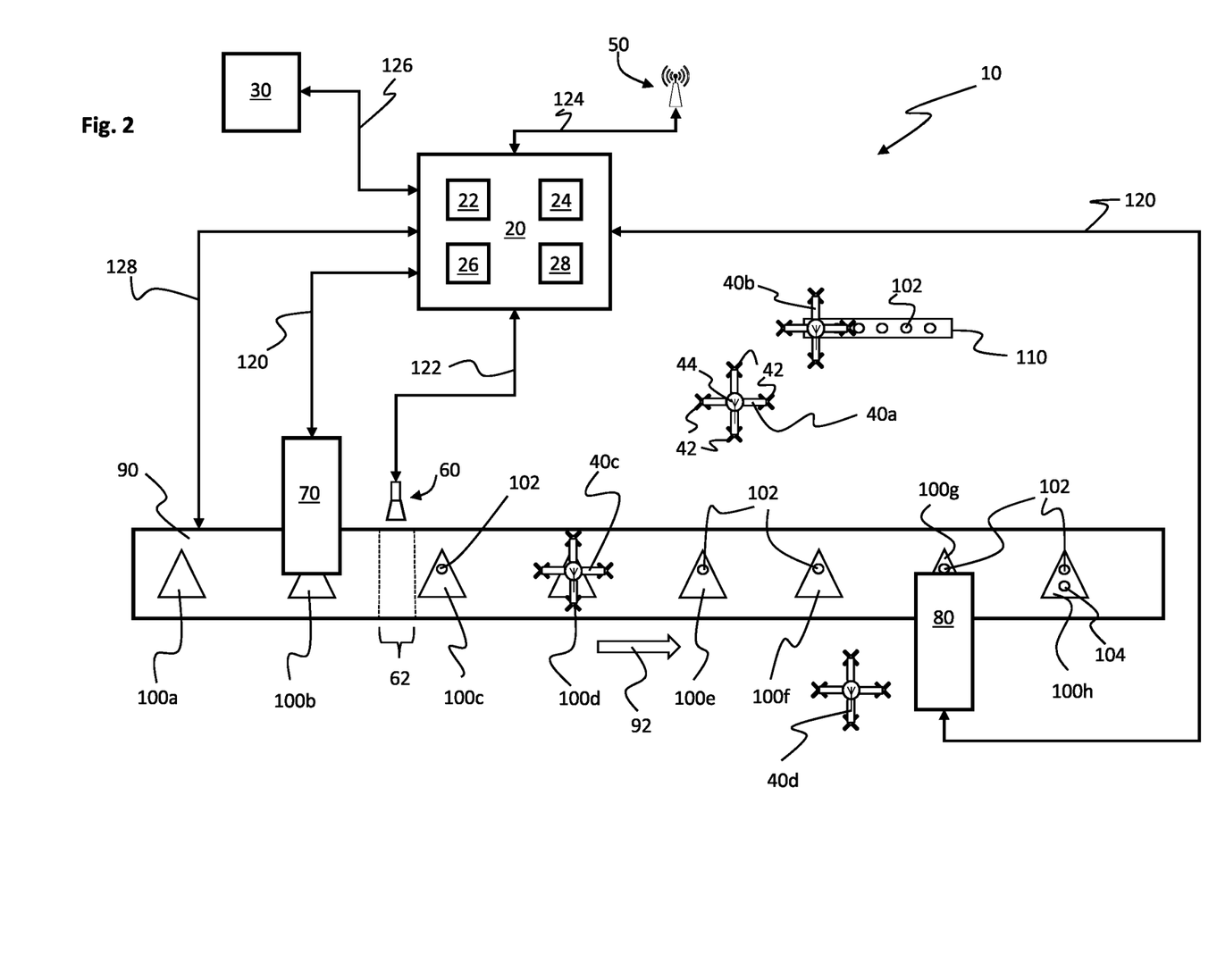
FIG. 2 shows the automation system according to FIG. 1 with a plurality of unmanned aircraft.

FIG. 2 shows the automation system 10 according to FIG. 1, with a plurality of drones 40a to 40d being provided to carry out tasks. The plurality of drones 40a to 40d are thus used and are controlled by the control device 20.

This can be advantageous for example in order to increase for example the conveying speed of the conveyor belt 90 without dispensing with the possibility of the subsequent adhesive bonding of elements 102 on the part of a drone 40.

Whereas for example the drone 40a remains in a standby position after adhesive bonding has been carried out, the drone 40b for example currently picks up a new element 102. At the same time, for example the drone 40c adhesively bonds its picked-up element 102 onto the product 100d.

Therefore, it is thus possible in an advantageous manner for example for a plurality of products to be post-processed in parallel.

In addition, the automation system 10 comprises a further drone 40d which has additional sensors in order to monitor the individual components of the automation system 10. Thus, the drone 40d can, for example, detect a temperature in the region of the second processing station 80 and transmit it to the control device 20 by the wireless communication connection via the transmitter 50 and the data line 124.

The control device 20 can then monitor for example whether the temperature is or is not situated in a predetermined, admissible temperature range. Should the temperature have left the admissible temperature range, this indicates a fault, and the control device 20 can for example initiate corresponding counter-measures.

The concept of the use of drones in an automation system advantageously makes possible a situation in which for example it is no longer necessary for all the critical components in the automation system 10 to be equipped with a temperature sensor, thus particularly saving on components and on a cabling outlay.

For example, all four drones 40a to 40d have an identical structure, with the result that the control device 20 can always organize, in a situation-dependent manner, the individual drones 40a to 40d for the various tasks such as picking up an element 102, transporting an element 102, adhesively bonding an element 102 and/or monitoring the automation system 10 and can transmit corresponding control data to them.

For example, it is thus advantageously made possible that always one of the drones 40a to 40d is resupplied with energy for the flight operation and/or the actuators, for example in a charging station, while the remaining drones are further operated in flight operation.

Particularly when using a plurality of drones 40a to 40d in the automation system 10, there is provision for example that, in addition to the actual flight path planning of the individual drones 40a to 40d, the control device 20 additionally determines their instantaneous position and tailors, that is to say adapts, the individual flight paths to one another in order to avoid collisions.

Figure 3:
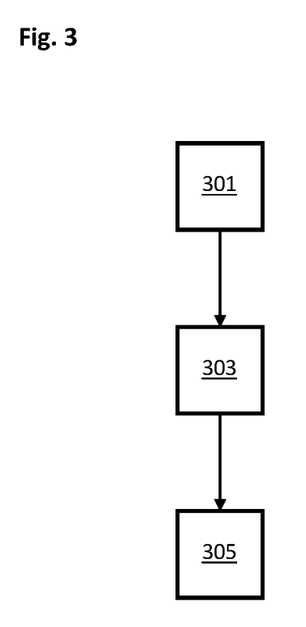
FIG. 3 shows a flow diagram of a method for operating an automation system.

FIG. 3 shows a flow diagram of a method for operating an automation system according to one embodiment.

The automation system is for example the automation system 10 shown in FIGS. 1 and 2.

There is provision according to a step 301 that the control device determines control data (which can generally also be referred to as flight commands) to control the unmanned aircraft for the unmanned aircraft, the control data specifying a task to be carried out by the unmanned aircraft to support the operation of the machine.

The control data specify for example a target position toward which the aircraft is intended to fly. The control data specify for example along which route the aircraft is intended to fly to the target position.

According to a step 303, the control data are transmitted to the unmanned aircraft by radio.

The aircraft comprises a dedicated flight controller which, on the basis of the received control data, correspondingly controls the aircraft according to a step 305.

For example, the target position is a conveyor belt above which the aircraft is intended to fly in order, by a camera of the aircraft, to take images of the objects conveyed by the conveyor belt. The aircraft transmits the recorded images for example by radio to the control device which for example evaluates the images and for example controls the conveyor belt on the basis of the evaluation.

If, for example on the basis of the evaluation of the images, the control device determines that one of the objects to be conveyed has a defect for example, there is provision for example that the control device halts the conveyor belt.

The control device for example informs human service personnel of the defect such that the human service personnel can exchange or remove the defective object manually.

The control device for example informs the aircraft using corresponding control data to exchange or to remove the defective object.

To manipulate, that is to say in particular to grip, the defective object, the aircraft comprises a gripping arm. The aircraft grips the defective object by the gripping arm and transports it by air to a certain location. In particular, the aircraft analogously transports, using its gripping arm, a nondefective, that is to say functioning, object to the conveyor belt and deposits it onto the conveyor belt.

On the basis of the control data, there is provision for example that the unmanned aircraft carries out the task to be carried out.

On the basis of the control data, there is provision for example that the control device remotely controls the aircraft such that it carries out the task to be carried out.

In summary, the invention is based on the idea of utilizing or using unmanned aircraft to perform tasks in the automation of machines, installations and buildings.

An essential idea according to the invention is furthermore that the control of the aircraft is performed by the same controller which also controls the machines and/or installations of the automation system. That is to say for example that control commands for the unmanned aircraft are determined by the control device.

The control device can also be referred to as an automation controller. For example, the control device controls a CNC machine (CNC stands for "computerized numerical control"). The control device is thus for example a CNC control device.

It is thus for example possible in an advantageous manner for the CNC control device to be used to effectively and reliably control one or more drones in the tightest of spaces In one embodiment, the control device is a programmable logic controller (PLC).

In one embodiment, the control device is a robot control device.

In one embodiment, the unmanned aircraft comprises one or more rotors.

In one embodiment, the unmanned aircraft is a quad- or hexa- or octocopter, in general a multicopter.

In one embodiment, the unmanned aircraft comprises a dedicated controller.

The automation controller particularly knows an instantaneous position and location of each drone used.

For example, the drone is activated in an energy-optimized manner by the control device. An energy-optimized activation means in particular an avoidance of rapid accelerations and/or abrupt changes of direction.

The control device particularly performs an optimized path planning for the drone. Optimized particularly means here an optimization in terms of an energy efficiency, a quickest route and/or a collision avoidance.

A flight path of the drone is programmed for example via G-Code (DIN66025) commands.

For example, a teaching and a storage of movements of the drone are provided which are then followed in an automated manner by the drone in its flight.

A movement and/or an orientation of the aircraft in one or more spatial dimensions are/is preferably correlated with movement sequences of the machine by the automation controller.

In particular, there is provision that a path generation for the aircraft is performed by the automation controller.

In particular, there is provision that the unmanned aircraft is integrated as a standard movement object or as a movement axis with an associated program in the automation controller.

In particular, a cooperation of the unmanned aircraft and a standard movement object or a movement axis is provided, for example via a coupling. That is to say in particular that the standard movement object or the movement axis is coupled or linked to the aircraft.

In particular, a collaboration of the aircraft with a standard movement object or a movement axis is provided.

In particular, there is provision that, in the case of a plurality of drones which are used at the same time, the control device automatically selects the most suitable or closest drone for the specific task.

In particular, there is provided an automatic or intelligent assignment of individual drones to different production processes or production lines depending on the current or expected requirement.

In particular, there is provision that the aircraft perform movement sequences which are correlated with one another.

In one embodiment, there is provision that the drone is activated in a wired and/or wireless manner. A wireless activation comprises for example an activation by a wireless communication connection.

A wireless communication connection is achieved for example using one or more of the following wireless communication technologies:

Bluetooth [LE], having the advantage of an advantageous coexistence of a plurality of drones and of a low energy consumption;
WISA [industrial standard:]; WirelessHART [industry standard]; ultra broadband (UWB); DECT; FUNK; ZigBee; optical information transmission, for example using a laser. An optical information transmission particularly has the advantage of a high data transmission speed and of a high electromagnetic compatibility (EMC).

In one embodiment, the drone is configured as a slave, in particular as an EtherCAT slave.

In one embodiment, the drone has one or more shielding devices in order for example to minimize wind loads for the workpiece to be transported or to be processed.

In one embodiment, there is provision that the drone has in each case an autonomous energy supply both for flight operation and for an arranged actuator or sensor.

In one embodiment, an energy management of the drone is controlled by the control device. Should for example a storage capacity of an energy supply for the flight operation end, the control device automatically switches to an energy supply for an actuator or sensor in order to ensure or maintain a flight operation.

In one embodiment, there is provision that the control device monitors an actual state of the drone. The control device thus performs condition monitoring. The control device monitors the drone for example in terms of an energy consumption or of a remaining flying time (residual flying time) and/or possible damage to the actuator or to the sensor or to units, for example to a propeller, of the drone.

The drone is designed for example to react autonomously to possible collisions, for example by the dedicated controller.

In one embodiment, the aircraft comprises a barcode scanner. The aircraft can thus be used in an advantageous manner as a flying barcode scanner as constituent part of a production line.

In one embodiment, the aircraft comprises a camera, in particular a video camera. The aircraft can thus be used in an advantageous manner as a flying camera as constituent part of a production line.

In one embodiment, the aircraft transports workpieces or production materials. For example as the task to be carried out, the aircraft transports fitting parts in the production of furniture and inserts them into a piece of furniture.

In one embodiment, a removal and a transporting away of workpieces from a production installation by the aircraft are provided as the task to be carried out.

In one embodiment, the aircraft comprises a machining head of a cutting machine, in particular of a laser cutting machine. The aircraft can thus be used in an advantageous manner as a flying machining head of a cutting machine.

In one embodiment, the aircraft comprises a working head of a 3D printer. The aircraft can thus be used in an advantageous manner as a flying working head of a 3D printer.

In one embodiment, there is provision that the aircraft post-processes individual workpieces as the task to be carried out.

In one embodiment, there is provision that the aircraft, as the task to be carried out, fills packaging units which are not completely filled.

In one embodiment, there is provision that the aircraft, as the task to be carried out, performs chemical and/or other analyses during the flight operation of its surroundings.

In one embodiment, an introduction and/or exchange of workpiece sequences on a transport path by the aircraft are/is provided as the task to be carried out.

In one embodiment, the aircraft has, in addition to the actuators or sensors for the actual task, additional sensors in order for example, during fly-past, to detect any disturbances and/or to carry out other condition monitoring tasks with respect to automation components past which the aircraft flies and to transmit data (for example environment sensor data) corresponding to the detection to the control device.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. An automation system, comprising:
a control device for controlling at least one machine, and at least one unmanned aircraft,
wherein the control device is configured to control the at least one machine and the unmanned aircraft to support an operation of the machine via a communication network, and
wherein the communication network comprises a bus system and the unmanned aircraft is configured as a slave.

2. The automation system as claimed in claim 1, wherein the control device is designed to control the unmanned aircraft in dependence on the control of the machine.

3. The automation system as claimed in claim 1,
wherein the control device is designed to determine control data for controlling the unmanned aircraft for the unmanned aircraft,
wherein the control data specify a task to be carried out by the unmanned aircraft to support the operation of the machine, and
wherein the unmanned aircraft is designed to carry out the task to be carried out autonomously and/or in a remote-controlled manner by the control device on the basis of the control data.

4. The automation system as claimed in claim 3, wherein the task comprises one or more of the following tasks: transporting an object to the machine, transporting an object from the machine to a predetermined location, fetching an object from a predetermined location and transporting the object to the machine, checking at least one property of a product produced by the machine, repairing and/or post-processing a faulty product produced by the machine, filling a packaging unit which is not completely filled by the machine, introducing and/or exchanging a sequence of objects to be processed by the machine, or detecting the machine and/or an environment of the machine by an environment sensor of the unmanned aircraft and transmitting environment sensor data corresponding to the detection to the control device.

5. The automation system as claimed in claim 1,
wherein the unmanned aircraft and/or the control device are/is designed to determine an instantaneous position of the unmanned aircraft, and
wherein the control device is designed to control the unmanned aircraft on the basis of the instantaneous position of the unmanned aircraft.

6. The automation system as claimed in claim 5,
wherein the unmanned aircraft is designed to detect an environment of the aircraft during a flight, and
wherein the unmanned aircraft and/or the control device are/is designed to create a digital map of the environment on the basis of the detected environment and to determine the instantaneous position of the unmanned aircraft within the digital map.

7. The automation system as claimed in claim 6, wherein the unmanned aircraft and/or the control device are/is designed to create the digital map of the environment using a SLAM method.

8. The automation system as claimed in claim 1, wherein the control device is configured to monitor an actual state selected from energy consumption or residual flying time of the unmanned aircraft, and to control the unmanned aircraft on the basis of the actual state.

9. An automation system comprising:
a control device for controlling at least one machine, and at least one unmanned aircraft,
wherein the control device is configured to control the unmanned aircraft to support an operation of the machine,
wherein the control device is configured to control an energy management of the unmanned aircraft,
wherein the unmanned aircraft has a first energy supply exclusively for a flight operation and a second energy supply for an actuator and/or a sensor, and
wherein the control device is configured, when a storage capacity of the first energy supply falls below a predetermined storage capacity threshold value, to switch from the first energy supply to the second energy supply to maintain the flight operation.

10. An automation system comprising:
a control device for controlling at least one machine, and a plurality of unmanned aircraft,
wherein the control device is configured to control the unmanned aircraft to support an operation of the machine, and
wherein the control device is configured to control the plurality of unmanned aircraft in such a way that one of the plurality of unmanned aircraft is supplied at a charging station with electrical energy for a flight operation and/or for a sensor and/or an actuator, while the remainder of the plurality of unmanned aircraft are operated in a flight operation.

11. An automation system comprising:
a control device for controlling at least one machine, and at least one unmanned aircraft,
wherein the control device is configured to control the unmanned aircraft to support an operation of the machine,
wherein the machine is a cutting machine, and the unmanned aircraft comprises a machining head of the cutting machine; or
wherein the machine is a 3D printer, and wherein the unmanned aircraft comprises a working head of the 3D printer.

12. An automation system, comprising:
at least one machine,
at least one unmanned aircraft, and
a control device which is configured to control the unmanned aircraft to support an operation of the machine,
wherein the control device is an automation controller for controlling the at least one machine,
wherein the machine comprises one or more movement axes which are controlled by the automation controller, and
wherein the unmanned aircraft comprises a further movement axis, by which is controlled by the automation controller via execution of control software, wherein the automation controller integrates the control of the further movement axis of the unmanned aircraft into the control of the one or more movement axes of the machine.

13. The automation system as claimed in claim 12,
wherein the control device is designed to determine control data for controlling the unmanned aircraft for the unmanned aircraft,
wherein the control data specify a task to be carried out by the unmanned aircraft to support the operation of the machine, and
wherein the unmanned aircraft is designed to carry out the task to be carried out autonomously and/or in a remote-controlled manner by the control device on the basis of the control data.

14. The automation system as claimed in claim 13, wherein the task comprises one or more of the following tasks:
transporting an object to the machine,
transporting an object from the machine to a predetermined location,
fetching an object from a predetermined location and transporting the object to the machine,
checking at least one property of a product produced by the machine,
repairing and/or post-processing a faulty product produced by the machine,
filling a packaging unit which is not completely filled by the machine,
introducing and/or exchanging a sequence of objects to be processed by the machine, or
detecting the machine and/or an environment of the machine by an environment sensor of the unmanned aircraft and transmitting environment sensor data corresponding to the detection to the control device.

15. The automation system as claimed claim 12,
wherein the unmanned aircraft and/or the control device are/is designed to determine an instantaneous position of the unmanned aircraft, and
wherein the control device is designed to control the unmanned aircraft on the basis of the instantaneous position of the unmanned aircraft.

16. The automation system as claimed in claim 15,
wherein the unmanned aircraft is designed to detect an environment of the aircraft during a flight, and
wherein the unmanned aircraft and/or the control device are/is designed to create a digital map of the environment on the basis of the detected environment and to determine the instantaneous position of the unmanned aircraft within the digital map.

17. The automation system as claimed in claim 16, wherein the unmanned aircraft and/or the control device are/is designed to create the digital map of the environment using a SLAM method.

18. The automation system as claimed in claim 17, wherein the control device is designed to control an energy management of the unmanned aircraft.

19. The automation system as claimed in claim 18,
wherein the unmanned aircraft has a first energy supply exclusively for a flight operation and a second energy supply for an actuator and/or a sensor, and
wherein the control device is designed, when a storage capacity of the first energy supply falls below a predetermined storage capacity threshold value, to switch from the first energy supply to the second energy supply to maintain the flight operation.

20. The automation system as claimed in claim 19, wherein the control device is configured to monitor an actual state selected from energy consumption or residual flying time of the unmanned aircraft, and to control the unmanned aircraft on the basis of the actual state.

21. The automation system as claimed in claim 20,
wherein a plurality of unmanned aircraft are provided, and
wherein the control device is designed to control the plurality of unmanned aircraft in such a way that one of the plurality of unmanned aircraft is supplied at a charging station with electrical energy for a flight operation and/or for a sensor and/or an actuator, while the remainder of the plurality of unmanned aircraft are operated in a flight operation.

22. The automation system as claimed in claim 21,
wherein the machine is a cutting machine, and the unmanned aircraft comprises a machining head of the cutting machine; or
wherein the machine is a 3D printer, and wherein the unmanned aircraft comprises a working head of the 3D printer.

23. A method for operating an automation system as claimed in claim 12, the method comprising:
controlling the unmanned aircraft by the control device to support the operation of the machine.

* * * * *